(12) United States Patent
He et al.

(10) Patent No.: US 10,365,181 B2
(45) Date of Patent: Jul. 30, 2019

(54) THREE-DIMENSIONAL STANDARD VIBRATOR BASED ON LEAF-SPRING-TYPE DECOUPLING DEVICE

(71) Applicant: ZHEJIANG UNIVERSITY, Zhejiang (CN)

(72) Inventors: Wen He, ZheJiang (CN); Xufei Zhang, ZheJiang (CN); ShuShi Jia, ZheJiang (CN); Jie Zhou, ZheJiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 23 days.

(21) Appl. No.: 15/542,639

(22) PCT Filed: Aug. 18, 2015

(86) PCT No.: PCT/CN2015/087344
§ 371 (c)(1),
(2) Date: Jul. 10, 2017

(87) PCT Pub. No.: WO2016/112686
PCT Pub. Date: Jul. 21, 2016

(65) Prior Publication Data
US 2018/0106699 A1 Apr. 19, 2018

(30) Foreign Application Priority Data
Jan. 15, 2015 (CN) .......................... 2015 1 0019692

(51) Int. Cl.
*G01M 7/06* (2006.01)
(52) U.S. Cl.
CPC ..................... *G01M 7/06* (2013.01)
(58) Field of Classification Search
CPC ....................................................... G01M 7/06
(Continued)

(56) References Cited

U.S. PATENT DOCUMENTS

| 3,952,980 A | 4/1976 | Pragenau et al. |
| 4,085,825 A | 4/1978 | Scarborough |

(Continued)

FOREIGN PATENT DOCUMENTS

| CN | 201138277 | 10/2008 |
| CN | 102865985 A | 1/2013 |

(Continued)

OTHER PUBLICATIONS

International Search Report & Written Opinion dated Nov. 17, 2015 from corresponding International PCT Application No. PCT/CN2015/087344.

*Primary Examiner* — Jacques M Saint Surin
(74) *Attorney, Agent, or Firm* — Lathrop Gage LLP

(57) ABSTRACT

The three-dimensional standard vibrator based on leaf-spring-type decoupling device contains a base set with three single-dimensional vibrators (along X, Y and Z axes, respectively) and a three-dimensional vibration platform. The X axis vibrator is connected with the three-dimensional vibration platform through X axis decoupling device, the Y axis vibrator is connected with the three-dimensional vibration platform through Y axis decoupling device, and the Z axis vibrator is connected with the three-dimensional vibration platform through Z axis decoupling device. The properties of the three-dimensional vibrator are as follow. X axis decoupling device, Y axis decoupling device and Z axis decoupling device are all comprised of supporting-spring units. Each of the supporting-spring units contains a pair of leaf springs mounted parallel with each other and the first and second connecting components mounted on the two edges of the leaf springs.

4 Claims, 2 Drawing Sheets

(58) Field of Classification Search
USPC .......................................................... 73/666
See application file for complete search history.

(56) References Cited

U.S. PATENT DOCUMENTS

| | | | | | |
|---|---|---|---|---|---|
| 4,976,415 | A | * | 12/1990 | Murai | B23Q 11/0032 188/378 |
| 5,988,359 | A | * | 11/1999 | Graham | B65G 27/08 198/757 |
| 9,222,544 | B2 | * | 12/2015 | Bartel | F16F 15/007 |
| 2003/0200811 | A1 | * | 10/2003 | Woyski | G01M 7/02 73/663 |
| 2005/0255367 | A1 | * | 11/2005 | Takahashi | H01M 8/0265 429/434 |
| 2009/0039734 | A1 | * | 2/2009 | Takahashi | H02N 2/0025 310/323.02 |
| 2013/0328337 | A1 | * | 12/2013 | Melcher | F16F 7/104 296/1.03 |
| 2014/0027601 | A1 | * | 1/2014 | Bartel | F16F 15/007 248/550 |
| 2017/0350787 | A1 | * | 12/2017 | He | G01M 7/06 |

FOREIGN PATENT DOCUMENTS

| | | | |
|---|---|---|---|
| CN | 102364316 B | | 8/2013 |
| CN | 103912766 A | | 7/2014 |
| CN | 104596720 A | | 5/2015 |
| CN | 204556207 U | | 8/2015 |
| JP | 2001108570 A | * | 4/2001 |

* cited by examiner

THREE-DIMENSIONAL STANDARD VIBRATOR BASED ON LEAF-SPRING-TYPE DECOUPLING DEVICE

FIELD OF THE INVENTION

This present invention relates to a three-dimensional standard vibrator.

BACKGROUND OF THE INVENTION

Recently, the calibration of three-dimensional vibration sensor is usually based on a single dimension vibration calibration system, which calibrates the three axes of the sensor one after another. Inevitably, this method consumes too much time and complicates the data processing system. In the meantime, considering the cross-axis coupling of the three-dimensional sensor, it is hard to obtain the sensitivity matrix, which represents the coupling relations between the three axes of the sensor based on this method. So development of a three-dimensional standard vibrator, which output vibration exciting signals to the three axes of the three-dimensional sensor, has important theoretical and practical significance on the development of vibration sensor calibration technology and the progressing of related industry technology.

Chinese patent CN 201110207297.5 announces a three-dimensional standard vibrator based on a latch-type decoupling device. The vibrator consists of a base, three single-dimensional electromagnetic vibrators along X, Y, and Z axis, and a three-dimensional vibration platform. Each of the single-dimensional vibrators is connected with the three-dimensional vibration platform through a motion decoupling device. The motion decoupling device consists of the first and second frameworks, which are intersected with each other. The two frameworks all comprise the outer frame, the inner frame, the first and second lateral frames between the outer and inner frames. The outer frame is opposite to the inner frame, and the inner frame from one of the frameworks is inserted into another framework. The inner frame of the first framework is drilled with gas channels and vent holes, and the two ends of the vent holes are connected with the gas channels and the outside atmospheres. The second framework is installed with the inner frame and outer frame both have little intervals to the inner frame of the first framework, and the intervals could form aerostatic guide rails. There is an interval between the inner frame of the second framework and the outer frame of the first framework to avoid interfering of the two frameworks. The gas channels are connected with the outside pressured gas sources. The two outer frames of the first framework and the second framework are connected with the electromagnetic vibrator and the three-dimensional vibration platform, respectively. The latch-type structures and the aerostatic guide rails are utilized in the vibrator to realize force transmissions and to solve the issue of motion decoupling for three-dimensional vibrations.

The shortcomings of the proposed vibrator are as follow. The required accuracy of the assembling is excessively high since the first and second frameworks are mounted on the vibrator and the three-dimensional vibration platform respectively, and the two frameworks are inserted with each other with latch-type structure. Besides, the second framework increases the mass of the three-dimensional vibration platform and the stiffness of the gas film is relatively a restriction when used for vibration transmissions in high frequencies.

SUMMARY OF THE INVENTION

To overcome the above shortcomings of the prior art, the present invention provides a three-dimensional standard vibrator based on leaf-spring-type decoupling device, which decreases the requirement of assembling accuracy and performs larger stiffness than the aerostatic gas film when transmitting vibrations.

The three-dimensional standard vibrator based on leaf-spring-type decoupling device contains a base set with three single-dimensional vibrators (along X, Y and Z axes, respectively) and a three-dimensional vibration platform. The X axis vibrator is connected with the three-dimensional vibration platform through X axis decoupling device, the Y axis vibrator is connected with the three-dimensional vibration platform through Y axis decoupling device, and the Z axis vibrator is connected with the three-dimensional vibration platform through Z axis decoupling device.

The properties of the three-dimensional vibrator are as follow. X axis decoupling device, Y axis decoupling device and Z axis decoupling device are all comprised of supporting-spring units. Each of the supporting-spring units contains a pair of leaf springs mounted parallel with each other and the first and second connecting components mounted on the two edges of the leaf springs. The first connecting component is near the vibrator and the second connecting component is near the three-dimensional vibration platform.

In addition, X axis decoupling device, Y axis decoupling device and Z axis decoupling device are all comprised of two-stage supporting-spring units, which are connected in series with each other.

In addition, the two stages of the supporting-spring units, whose leaf springs are orthogonally mounted, are fixed with each other through a connector.

In addition, the connector is with the cruciform geometry, and the two-stage supporting-spring units are mounted on the two orthogonal arms of the connector, respectively.

The leaf springs from one stage supporting-spring units are connected with the vibration platform of the corresponding single-dimensional vibrator through the first connecting component and the other leaf springs from another supporting-spring unit are connected with the three-dimensional vibration platform through the second connecting component. The planes of the leaf springs from the two-stage supporting-spring units are all mounted parallel to the axis of the corresponding single-dimensional vibrator, and the planes of the leaf springs from one stage of supporting-spring units are mounted perpendicular to the axis of another single-dimensional vibrator.

In addition, the two connecting components are all comprised of a pair of L-type connecting pieces, and the connecting pieces are all drilled with screw holes for connecting bolts.

The operating processes of the present invention are as follow. Since the three decoupling devices along X, Y and Z axes are all comprised of two-stage supporting-spring units, they could be regarded as leaf-spring-type motion decoupling devices. Take the vibrations output from the X axis vibrator as an example. First, the vibrations are transmitted to the X axis decoupling device, which is connected with the X axis vibrator. Since the planes of the two-stage springs from the decoupling device are all parallel with X axis, the springs perform high stiffness properties. Then the vibrations can be transmitted precisely to the three-dimensional vibration platform, which is connected with the X axis vibrator. At the same time, the planes of the springs from one stage supporting-spring unit are perpendicular to the operating axis of the Y axis vibrator, so the springs perform small stiffness properties and the output disturbances from the Y axis vibrator to X axis could be neglected. The planes of the springs from another stage supporting-spring unit are perpendicular to the operating axis of the Z axis vibrator, so the springs perform small stiffness properties and the output disturbances from the Z axis vibrator to X axis could be neglected. In summary, the decoupled vibrations along X axis could be output by the three-dimensional vibration platform. Similarly, for the vibrations output from the other two vibrators along Y and Z axes, the corresponding decoupled vibrations could also be output from the three-dimensional vibration platform. Then the resultant vibrations along X, Y and Z axes are output by the three-dimensional vibration platform.

The proposed three-dimensional standard vibrator consists of three leaf-spring-type decoupling devices and three single-dimensional vibrators. The leaf-spring-type decoupling devices are designed with intersecting springs, which can transmit vibrations along the desired axis as well as ignore the disturbed vibrations output from the other axes. The motion decoupling of the output vibrations from the three-dimensional vibrator is realized.

The advantages of the present invention are:

1. The supporting-spring units are fixed with the single-dimensional vibrators and the three-dimensional vibration platform by screw bolts directly, which means a simple connection, convenient positioning and simple installation.

2. Along the desired vibration output axis, the vibration transmission stiffness of the leaf-spring-type decoupling device is much higher than the conventional aerostatic gas film, so the upper limit operating frequency of the proposed three-dimensional standard vibrator is increased dramatically, the structure of the three-dimensional motion decoupling device is simplified, and the whole cost of the three-dimensional standard vibrator is decreased.

DETAILED DESCRIPTION OF THE INVENTION

Hereinafter, further embodiments of the present invention will be described with reference to the accompanying drawings.

Figure 1:
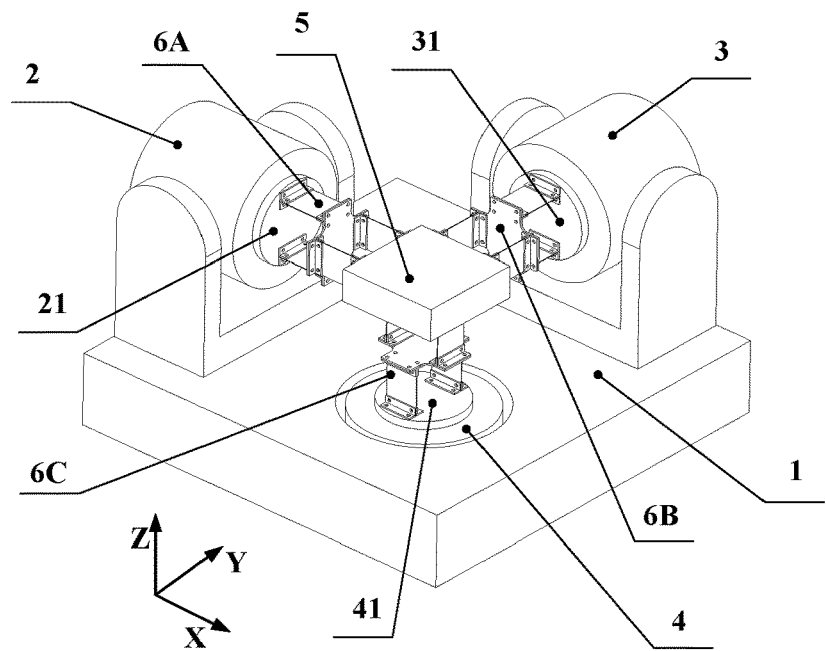
FIG. 1 is a schematic structure of the three-dimensional standard vibrator.

As shown in FIG. 1, the three-dimensional standard vibrator with leaf-spring-type decoupling device contains a base 1, a X axis (horizontal and single-dimensional, similarly hereinafter) vibrator 2, a Y axis (horizontal and single-dimensional, similarly hereinafter) vibrator 3, a Z axis (vertical and single-dimensional, similarly hereinafter) vibrator 4, a three-dimensional vibration platform 5, and three decoupling devices 6A, 6B and 6C along X, Y and Z axes respectively. The three vibrators 2, 3, 4 along X, Y and Z axis are all installed in the base 1 and connected with the three-dimensional vibration platform 5 through the three decoupling devices 6A, 6B and 6C correspondingly.

Figure 2:
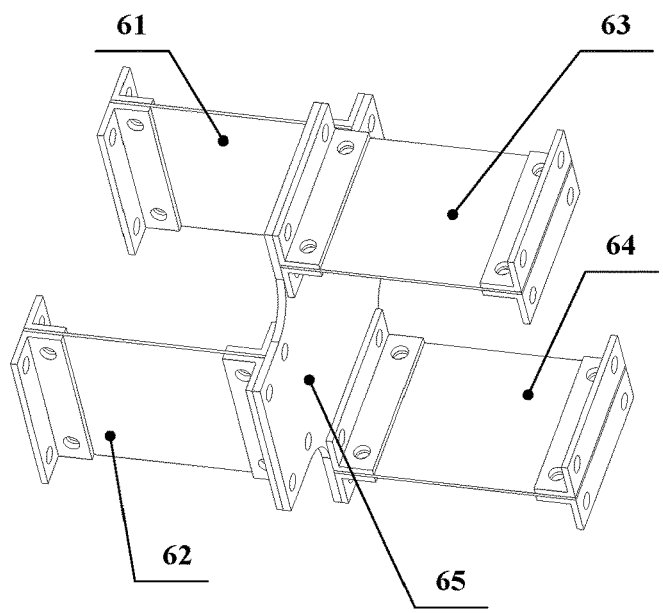
FIG. 2 is a structure diagram of the leaf-spring-type motion decoupling device.

As shown in FIG. 2, the X axis decoupling device 6A is comprised of the first, second, third and fourth spring components 61, 62, 63 and 64 and a cruciform connector 65. The first spring component 61 and the second spring component 62 constitute the first stage supporting-spring unit, and the third spring component 63 and the fourth spring component 64 constitute the second stage supporting-spring unit. The connector is used to connect the first stage supporting-spring unit and the second stage supporting-spring unit. As long as the orthogonal installation of the two stages supporting-spring units could be realized, the geometry of the connector could not be limited to cruciform type, but square type or rectangle type. Even though the embodiment has taken the illustration example of two stages supporting-spring units, the stage quantity could not be limited to two but changed based on the width of the single-dimensional vibrator and the three-dimensional vibration platform and the length of the supporting-spring unit.

Figure 3:
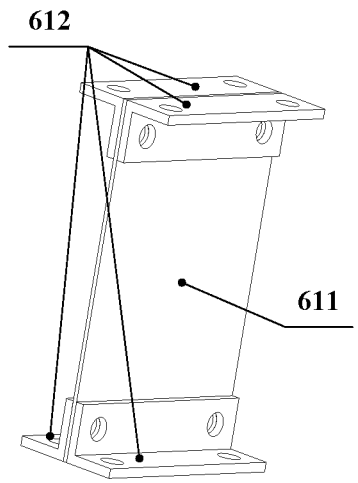
FIG. 3 is a structure diagram of the supporting-spring unit.

As shown in FIG. 3, the first spring component 61 consists of leaf spring 611 and L-type platen 612. Four pieces of platens 612 are mounted on the two edges of the leaf spring 611 symmetrically. The L-type platens form the first and second connecting components.

Figure 4:
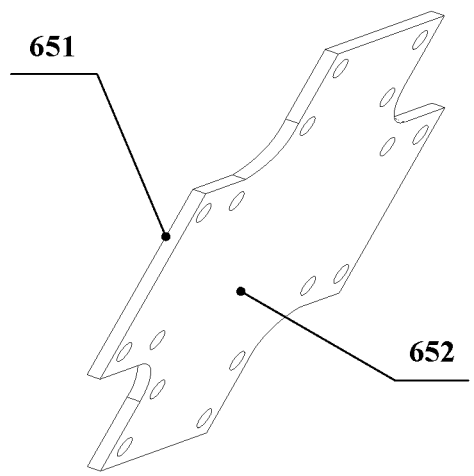
FIG. 4 is a structure diagram of the connector.

As shown in FIG. 2, FIG. 3 and FIG. 4, the first, second, third and fourth spring components 61, 62, 63 and 64 are all designed with the same geometries and installed into the connector 65. The properties of the installation are as follow. The first spring component 61 and the second spring component 62, whose spring planes are parallel with each other, are mounted on the first installation plane 651 of the connector 65 symmetrically to the connector center. The third spring component 63 and the fourth spring component 64, whose spring planes are parallel with each other, are mounted on the second installation plane 652 of the connector 65 symmetrically to the connector center. In addition, the spring planes from the first spring component 61 and the third spring component 63 are perpendicular to each other, the spring planes from the second spring component 62 and the fourth spring component 64 are perpendicular to each other.

The Y axis and Z axis decoupling device 6B and 6C are also leaf-spring-type motion decoupling devices, which are formed by two stages of supporting-spring units and designed with the same geometries and action mechanism of the X axis decoupling device 6A.

For the vibrations along X axis output from the three-dimensional standard vibrator, one edge of the X axis decoupling device 6A is connected to the vibration platform 21 of the X axis vibrator 2 through the L-type platen 612. The other edge is connected to the three-dimensional vibration platform 5. In the meantime, there are two spring planes have been chosen from the four supporting-spring units 61, 62, 63 and 64 to be horizontal direction, then the spring planes from the other two supporting-spring units are set to be vertical direction. Since the four spring planes are all perpendicular to the vibration platform 21, the springs perform high stiffness properties when used for transmitting vibrations. Then the vibrations output from the vibration platform 21 of the X axis vibrator 2 could be transmitted precisely to the three-dimensional vibration platform 5. Similarly, under the effect of the Y axis decoupling device 6B, the vibrations output from the vibration platform 31 of the Y axis vibrator 3 could be transmitted precisely to the three-dimensional vibration platform 5.

For the motion decoupling device 6C, which is used for transmitting the vibrations along Z axis, there are two spring planes have been chosen from the four supporting-spring units 61, 62, 63 and 64 to be parallel with the vibration platform 21 of the X axis vibrator 2, and the spring planes from the other two supporting-spring units are set to be parallel with the vibration platform 31 of the Y axis vibrator 3. Then the four spring planes are all perpendicular to the vibration platform 41 of the Z axis vibrator 4. When used for transmitting vibrations, the springs perform high stiffness properties, and the vibrations output from the vibration platform 41 of the Z axis vibrator 4 could be transmitted precisely to the three-dimensional vibration platform 5.

The operating processes of the present invention are as follow. Take the vibrations output from the X axis vibrator 2 as an example. First, the vibrations are transmitted to the X axis decoupling device 6A, which is connected with the X axis vibrator 2. Since the planes of the two-stage springs from the decoupling device are all perpendicular to the vibration platform 21 of the X axis vibrator 2, the springs perform high stiffness properties. Then the vibrations can be transmitted precisely to the three-dimensional vibration platform 5, which is connected with the X axis decoupling device 6A. At the same time, the planes of the springs from one stage supporting-spring unit are parallel with the vibration platform 31 of the Y axis vibrator 3, so the springs perform small stiffness properties and the output disturbances from the Y axis vibrator 3 to the X axis could be neglected. The planes of the springs from another stage supporting-spring unit are parallel to the vibration platform 41 of the Z axis vibrator 4, so the springs perform small stiffness properties and the output disturbances from the Z axis vibrator 4 to X axis could be neglected. In summary, the decoupled vibrations along X axis could be output by the three-dimensional vibration platform 5. Similarly, for the vibrations output from the other two vibrators 3 and 4 along Y and Z axes, the corresponding decoupled vibrations could also be output from the three-dimensional vibration platform 5. Then the resultant vibrations along X, Y and Z axes are output by the three-dimensional vibration platform 5.

The proposed three-dimensional vibrator consists of three leaf-spring-type decoupling devices and three single-dimensional vibrators. The leaf-spring-type decoupling devices are designed with intersecting springs, which can transmit the vibrations along the desired axis as well as ignore the disturbed vibrations output from the other axes. The motion decoupling of the output vibrations from the three-dimensional vibrator is realized.

The advantages of the present invention are:

1. The supporting-spring units are fixed with the single-dimensional vibrators and the three-dimensional vibration platform by screw bolts directly, which means a simple connection, convenient positioning and simple installation.

2. Along the desired vibration output axis, the vibration transmission stiffness of the leaf-spring-type decoupling device is much higher than the conventional aerostatic gas film, so the upper limit operating frequency of the proposed three-dimensional standard vibrator is increased dramatically, the structure of the three-dimensional vibration decoupling device is simplified, and the whole cost of the three-dimensional standard vibrator is decreased.

The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

What is claimed is:

1. A three-dimensional standard vibrator based on leaf-spring-type decoupling device comprises a base set with three single-dimensional vibrators: an X axis vibrator, a Y axis vibrator, and a Z axis vibrator; and a three-dimensional vibration platform; wherein the X axis vibrator is connected with the three-dimensional vibration platform through an X axis decoupling device, the Y axis vibrator is connected with the three-dimensional vibration platform through a Y axis decoupling device, and the Z axis vibrator is connected with the three-dimensional vibration platform through a Z axis decoupling device; wherein the X axis decoupling device, the Y axis decoupling device and the Z axis decoupling device comprise supporting-spring units; wherein each of the supporting-spring units contains a pair of leaf springs mounted parallelly with each other and a first and a second connecting components mounted on the two edges of the leaf springs; wherein the first connecting component is near the vibrator and the second connecting component is near the three-dimensional vibration platform; wherein the X axis decoupling device, the Y axis decoupling device and the Z axis decoupling device comprise at least two stages of supporting-spring units, which are connected in series with each other; wherein in the decoupling device along each axis, surfaces of the leaf springs in the two-stage supporting-spring units are all parallel to this axis, and surfaces of the leaf springs in one stage of the two-stage supporting-spring units are vertical to one of another two axes; wherein the planes of the leaf springs from the two-stage supporting-spring units are all mounted parallel to the axis of the corresponding single-dimensional vibrator, and the planes of the leaf springs from one stage of supporting-spring units are mounted perpendicular to the axis of another single-dimensional vibrator.

2. The three-dimensional standard vibrator based on leaf-spring type decoupling device according to claim 1, wherein the two stages of the supporting-spring units, whose leaf springs are orthogonally mounted, are fixed with each other through a connector.

3. The three-dimensional standard vibrator based on leaf-spring type decoupling device according to claim 1, wherein the connector is with the cruciform geometry, and the two-stage supporting-spring units are mounted on the two orthogonal arms of the connector, respectively.

4. The three-dimensional standard vibrator based on leaf-spring type decoupling device according to claim 3, wherein the two connecting components comprise a pair of L-type connecting pieces, and the connecting pieces are all drilled with screw holes for connecting bolts.

* * * * *